United States Patent [19]

Tse et al.

[11] 3,764,558

[45] Oct. 9, 1973

[54] CONSTANT LOW OXYGEN CONCENTRATION GAS REGENERATION OF REFINING CATALYSTS

[75] Inventors: Harold F. Tse, Bala Cynwyd; Walter H. Seitzer, West Chester, both of Pa.

[73] Assignee: Sun Oil Company of Pennsylvania, Philadelphia, Pa.

[22] Filed: June 24, 1971

[21] Appl. No.: 156,571

[52] U.S. Cl. .................. 252/419, 208/97, 252/414, 252/416
[51] Int. Cl. ........................ B01j 11/68, B01j 11/04
[58] Field of Search ..................... 252/419, 416, 414

[56] References Cited
UNITED STATES PATENTS 2,963,425  12/1960  Hansen, Jr. .......................... 252/419
2,813,835  11/1957  Nozaki ................................ 252/416
3,505,207  4/1970   Haney et al. ........................ 252/414
3,565,820  2/1971   Coons, Jr. et al. .................. 252/414
3,533,960  10/1970  Weinert .............................. 252/416

FOREIGN PATENTS OR APPLICATIONS 1,021,966  3/1966  Great Britain ...................... 252/419

Primary Examiner—Daniel E. Wyman
Assistant Examiner—P. E. Konopka
Attorney—George L. Church et al.

[57] ABSTRACT

Regeneration of highly coked hydrogenation catalysts using an inert gas and a constant 0.2 to 0.4 percent oxygen at from 775°F. to 850°F.

1 Claim, No Drawings

CONSTANT LOW OXYGEN CONCENTRATION GAS REGENERATION OF REFINING CATALYSTS

BACKGROUND OF THE INVENTION

In the past it has been difficult to regenerate highly coked hydrogenation catalysts. Such regeneration techniques generally involve burning the coke from the catalyst using an increasing amount of air as the coke is removed. The programming generally is not accurate enough when treating highly coked catalysts so that excessive heating generally occurs which has an adverse effect on the activity of the catalyst.

SUMMARY OF THE INVENTION

It has now been found that highly coked hydrogenation catalysts can be regenerated using a single controlled amount of oxygen in the regenerating gas throughout the operation. The highly coked catalysts which are being regenerated by the process of the present invention generally contain from 6 to 12 percent coke. This high coke deposition is the result of treating highly aromatic petroleum fractions and particularly petroleum fractions containing over 50 percent aromatics. Such highly aromatic petroleum stocks are encountered in the refining of various bitumens, particularly the cracked distillate fractions of such bitumens boiling above 500°F.

The catalysts used in the present invention are supported sulfided hydrogenation catalysts. These catalysts are prepared by depositing either nickel oxide or cobalt oxide or a mixture thereof and either molybdenum oxide, tungsten oxide or a mixture thereof on a support. The catalyst can then either be presulfided or can become sulfided in use. In an especially preferred aspect of the invention the catalyst when new contains from four to six weight percent of nickel oxide, cobalt oxide or a mixture thereof and from 11 to 13 percent of molybdenum oxide, tungsten oxide or a mixture thereof supported on alumina or silica-alumina containing up to 3.2 percent silica.

The catalyst is regenerated at from 775°F. to 850°F. using an inert gas containing from 0.2 to 0.4 volume percent oxygen. Preferred inert gases are steam, flue gas and nitrogen. Suitable regeneration pressures are from 250 to 500 p.s.i.g. when using flue gas or nitrogen and 0 to 150 p.s.i.g. when using steam. The coked catalyst is first washed with a relatively low boiling solvent such as kerosene to remove high boiling compounds therefrom. The solvent-washed catalyst is then purged with an inert gas such as steam, nitrogen or flue gas at from 500°F. to 700°F. A stream of the inert gas is introduced into the catalyst bed at from 775°F. to 850°F. until the whole bed is at a constant temperature within the range of 775°F. to 850°F. A stream of air is introduced into the inert gas stream to bring the oxygen to from 0.2 to 0.4 volume percent of the inert gas. This amount of oxygen is held constant throughout the regeneration. This combination of low oxygen concentration coupled with high regeneration temperature enables regeneration of these difficult-to-regenerate catalysts without significant loss of catalyst activity. When the typical low initial oxygen lower temperature process which involves gradual raising of the oxygen content of the regenerating gas during the process is used the effectiveness of the regenerated catalyst is seriously impaired. Surprisingly the process of the present invention can be performed in a few hours instead of the days required when the conventional process is used. The process can be carried out in situ or ex situ of the reactor.

The process of the present invention can be performed at any space rate which is possible with the equipment being used. Thus it can be carried out at the ordinary regeneration space rates of 20 to 30 if desired. However if the equipment is suitable it is preferred to operate at very high space rates of 1000 to 3000. At the temperatures used substantially all of the oxygen reacts therefore the time the regeneration takes depends on the space rate. For this reason the higher space rates are desired.

EXAMPLE I

Bitumen is obtained by steaming from Athabasca tar sand. The bitumen is then heated to 940°F. and charged to a delayed coker and coked at 915°F. at 25 p.s.i.g. The effluent from the delayed coker is distilled and the fraction boiling at from 525°F. to 805°F. (5 percent at 546°F., 95 percent at 750°F.) is removed, to form a gas oil feedstock. The gas oil is fed to a semiworks hydrofiner at a liquid hourly space velocity of 0.8, a hydrogen pressure of 1450 and a temperature of 700°F. The original catalyst was 5.3 percent nickel oxide, a trace of cobalt oxide, 12.4 percent molybdenum oxide supported on alumina. After one year of use the reaction is shut down and the catalyst is washed with kerosene. The catalyst in situ is brought to 800°F. with flue gas at 300 p.s.i.g. Oxygen (0.3 volume percent) is then fed into the flue gas in the form of air. The flue gas and air are flowed through the catalyst at a space velocity of 1600. The regeneration temperature of the flue gas as well as that of the flue gas and oxygen is maintained constant during the entire period. The catalyst is completely regenerated in eight hours. The spent catalyst contains 7 percent by weight sulfur and 8 percent by weight carbon prior to regeneration both of which are substantially 100 percent removed during regeneration. The performance of the catalyst in the sulfided form before and after regeneration is reported in Table I. The flue gas is a plant flue gas which is further oxidized to convert CO to $CO_2$ and any sulfur compound to $SO_2$ and $SO_3$. The thus oxidized flue gas is scrubbed with aqueous sodium hydroxide to remove the $CO_2$, $SO_2$ and $SO_3$. The resulting flue gas consists essentially of nitrogen.

EXAMPLE II

Example I is repeated using the same spent catalyst. The catalyst after washing with kerosene in situ is brought to 800°F. using steam at 100 p.s.i.g. Oxygen (0.3 volume percent) is then fed into the steam in the form of air. The steam and air are flowed through the catalyst at a space velocity of 1600. The regeneration temperature of the steam as well as that of the steam and oxygen is maintained constant during the entire period. The catalyst is completely regenerated in eight hours. The spent catalyst contains 7 percent by weight sulfur and 8 percent by weight carbon prior to regeneration both of which are substantially 100 percent removed during regeneration. The performance of the catalyst in the sulfided form before and after regeneration is reported in Table I.

TABLE I

| | Flue Gas-Air Regenerated | Steam-Air Regenerated |
| --- | --- | --- |

| Feed | New Catalyst Wt. % Removal on Product | Catalyst Wt. % Removal on Product | Catalyst Wt. % Removal on Product |
|---|---|---|---|
| Aromatics, wt. % 64 | 38 | 36.5 | 36.5 |
| Nitrogen, wt. % 0.2 | 75 | 75 | 80 |
| Sulfur, wt. % 3.6 | 97 | 97.3 | 97.7 |

In another test the catalyst flue gas regenerated as described above is compared in effectiveness with the same catalyst which has been regenerated in a rotary kiln. The comparison is reported in Table II.

TABLE II

| Activity | Flue Gas-Air Regenerated | Steam-Air Regenerated | Rotary Kiln Regenerated |
|---|---|---|---|
| On Aromatics | 100% | 95% | 62% |
| On Sulfur | 100% | 100% | 74% |

Feed: Aromatics, 64 wt. %; sulfur, 3.6 wt. percent; $N_2$, 0.2 wt. percent.

Operating conditions: liquid hourly space rate - 4.5; $H_2$ pressure - 1000 p.s.i.g.; temperature - 685°F.

The rotary kiln is divided into two sections. The first section is a drying zone in which the oil soaked (from the kerosene washing) is dried with hot air at 600° to 650°F. The second section is the oxidizing zone in which the catalyst is burned with an excess amount of air in order to keep the burning temperature below 800°F. A counterflow arrangement is used to operate the catalyst and the air. The speed of rotation and the amount of air in the system are dependent upon the catalyst bed temperature.

The invention claimed is:

1. A process of regenerating a sulfided hydrogenation catalyst which is nickel, cobalt or a mixture thereof and molybdenum, tungsten or a mixture thereof supported on alumina or silica-alumina containing up to 3.2 percent silica, and containing deposited thereon from 6 to 12 weight percent coke wherein said catalyst has been coked hydrogenating a cracked bitumen distillate boiling above 500°F., comprising treating said catalyst with a regeneration gas which is a mixture consisting essentially of nitrogen and from 0.2 to 0.4 volume percent oxygen at from 775°F. to 850°F. under a pressure of from about 250 p.s.i.g. to about 500 p.s.i.g., and at a regeneration gas space rate of from 1000 to 3000 until said coke is substantially totally removed from said catalyst.

* * * * *